July 14, 1936.  L. G. KNAPP  2,047,206
FARM TRUCK
Filed May 2, 1932   4 Sheets-Sheet 1

Inventor
Leland G. Knapp
By [signature]
attys

July 14, 1936.   L. G. KNAPP   2,047,206
FARM TRUCK
Filed May 2, 1932   4 Sheets-Sheet 2
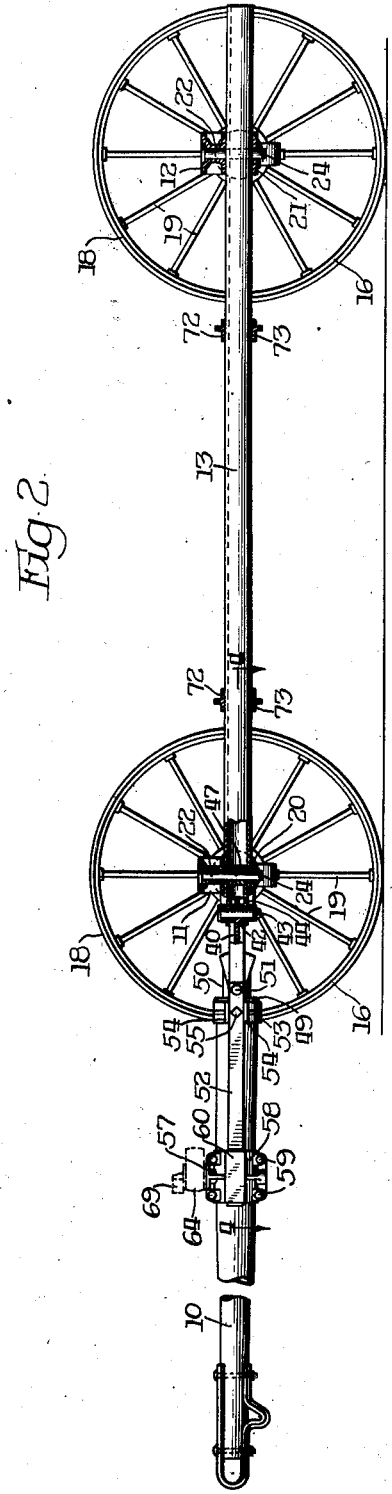
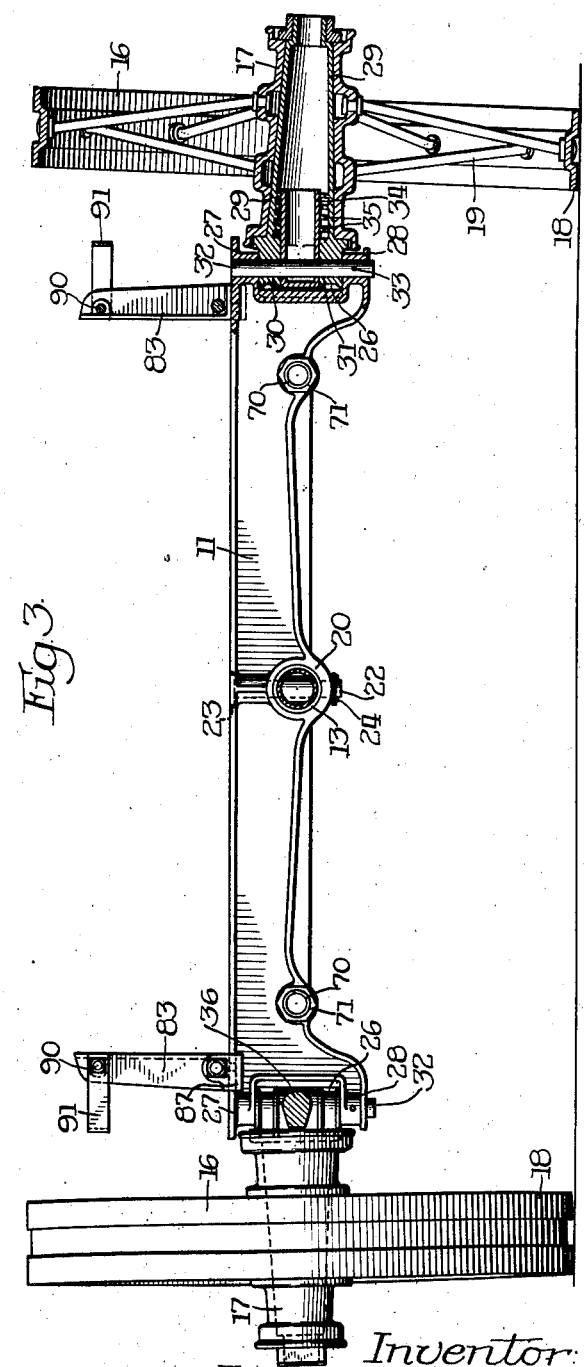
Inventor:
Leland G. Knapp
By
attys July 14, 1936.  L. G. KNAPP  2,047,206
FARM TRUCK
Filed May 2, 1932    4 Sheets-Sheet 3
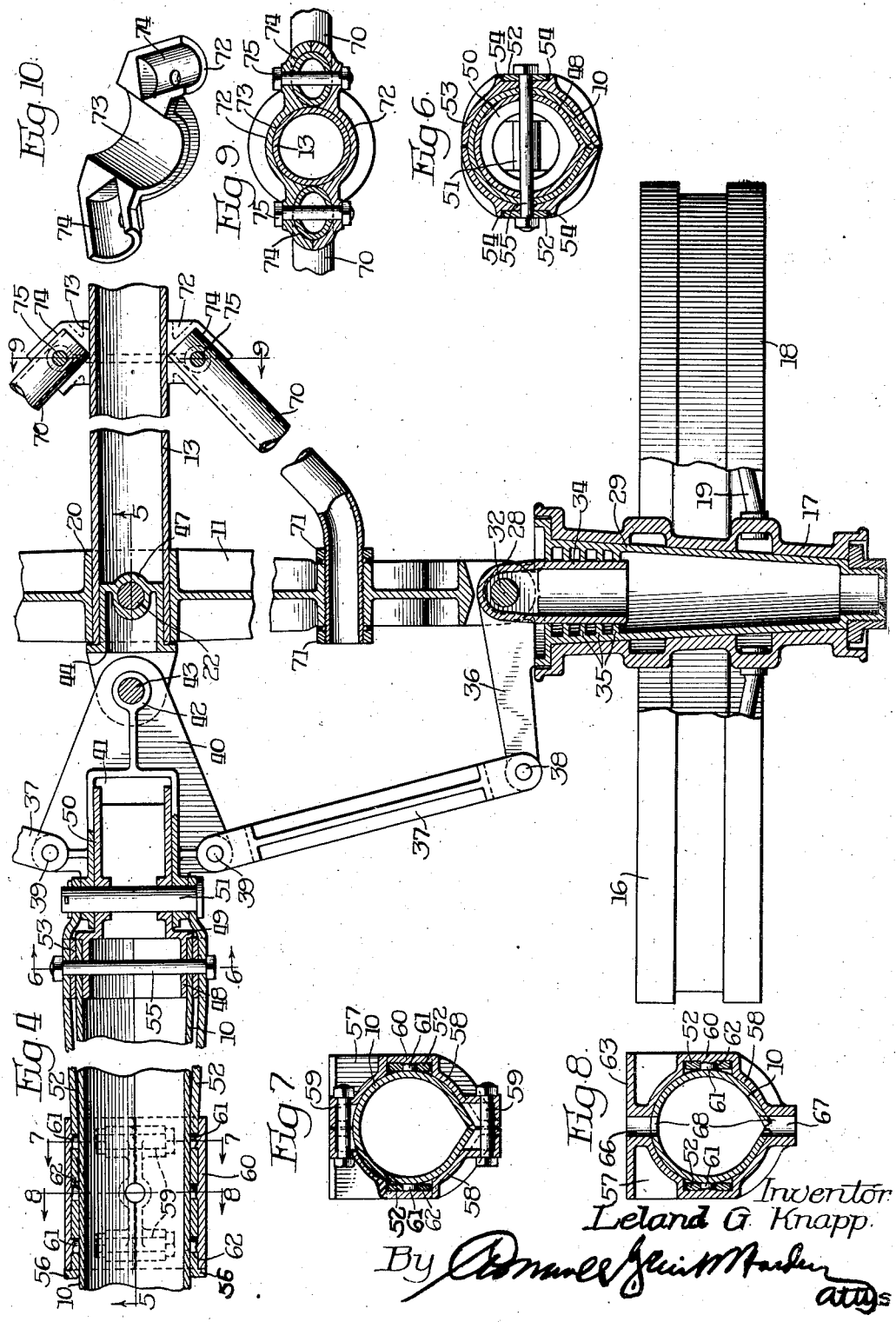
Inventor
Leland G. Knapp.
By [signature] attys July 14, 1936. L. G. KNAPP 2,047,206
FARM TRUCK
Filed May 2, 1932 4 Sheets-Sheet 4
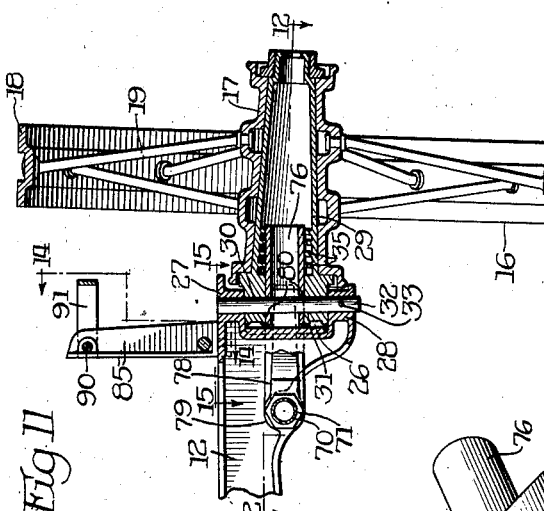
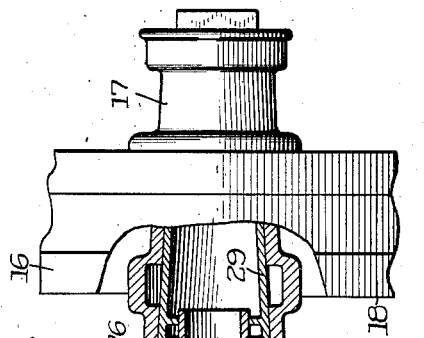
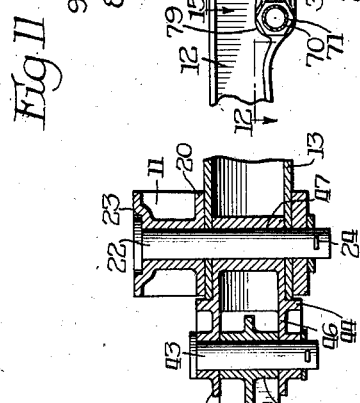
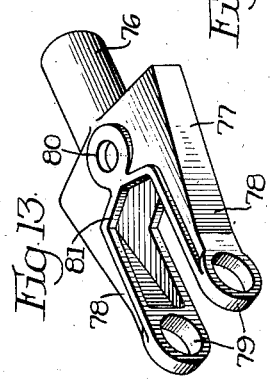
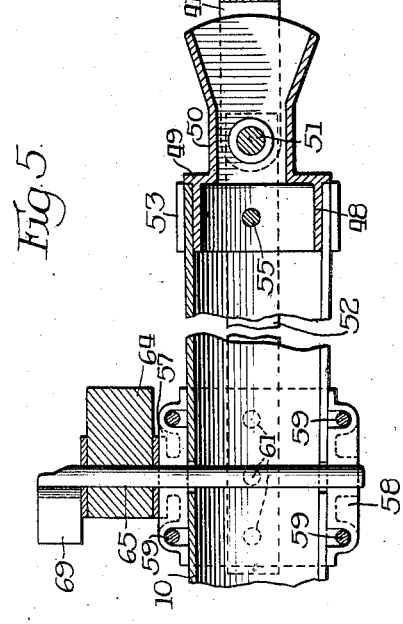
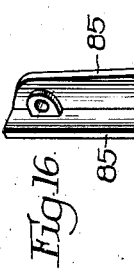
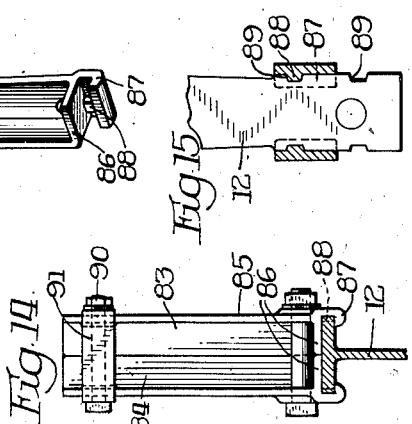
Inventor:
Leland G. Knapp.
By
attys Patented July 14, 1936

2,047,206

UNITED STATES PATENT OFFICE 2,047,206

FARM TRUCK

Leland G. Knapp, Chicago, Ill., assignor to Montgomery Ward & Co., Incorporated, Chicago, Ill., a corporation of Illinois Application May 2, 1932, Serial No. 608,705

5 Claims. (Cl. 280—33.55)

The present invention has for its primary object the production of a farm truck which is constructed wholly of metal, whereby to afford a truck capable of withstanding the hard usage to which farm vehicles are subjected, and thus prolong the life of the truck.

The invention contemplates a truck which possesses low center of gravity so as to be capable of easy loading and be free from liability of upsetting. At the same time the truck provides relative high clearance between the surface of the road and the bottom of the truck.

A further characteristic of the present invention is a truck of knock-down construction, adapting the same for ready shipment, and embodying interchangeable front and rear axle structures and other parts, all of which contribute effectively to reduce the costs of manufacture and assembly, and to permit the sale of the truck at a relatively low price.

Other advantages and features will become apparent as the nature of the improvements is better understood, the invention consisting substantially in the novel construction, combination and arrangement of parts hereinafter fully described, illustrated in the accompanying drawings, and finally pointed out in the appended claims.

The form of the invention made the basis of the present disclosure delineates a preferred embodiment thereof. It is, however, susceptible of change, variation and modification, and the disclosure, therefore, is to be understood from the illustrative standpoint and not as imposing limitation or restriction on the invention.

In the drawings,

Fig. 2 is a longitudinal sectional view thereof, as on the line 2—2, Fig. 1;

Fig. 3 is a transverse sectional view, as on the line 3—3, Fig. 1;

Fig. 4 is a sectional plan view, on an enlarged scale, of a portion of the front bolster, the reach, one of the front wheels, and the tongue, taken on the line 4—4, Fig. 2;

Fig. 5 is a longitudinal sectional view, also on an enlarged scale, as on the line 5—5, Fig. 4;

Figure 1:
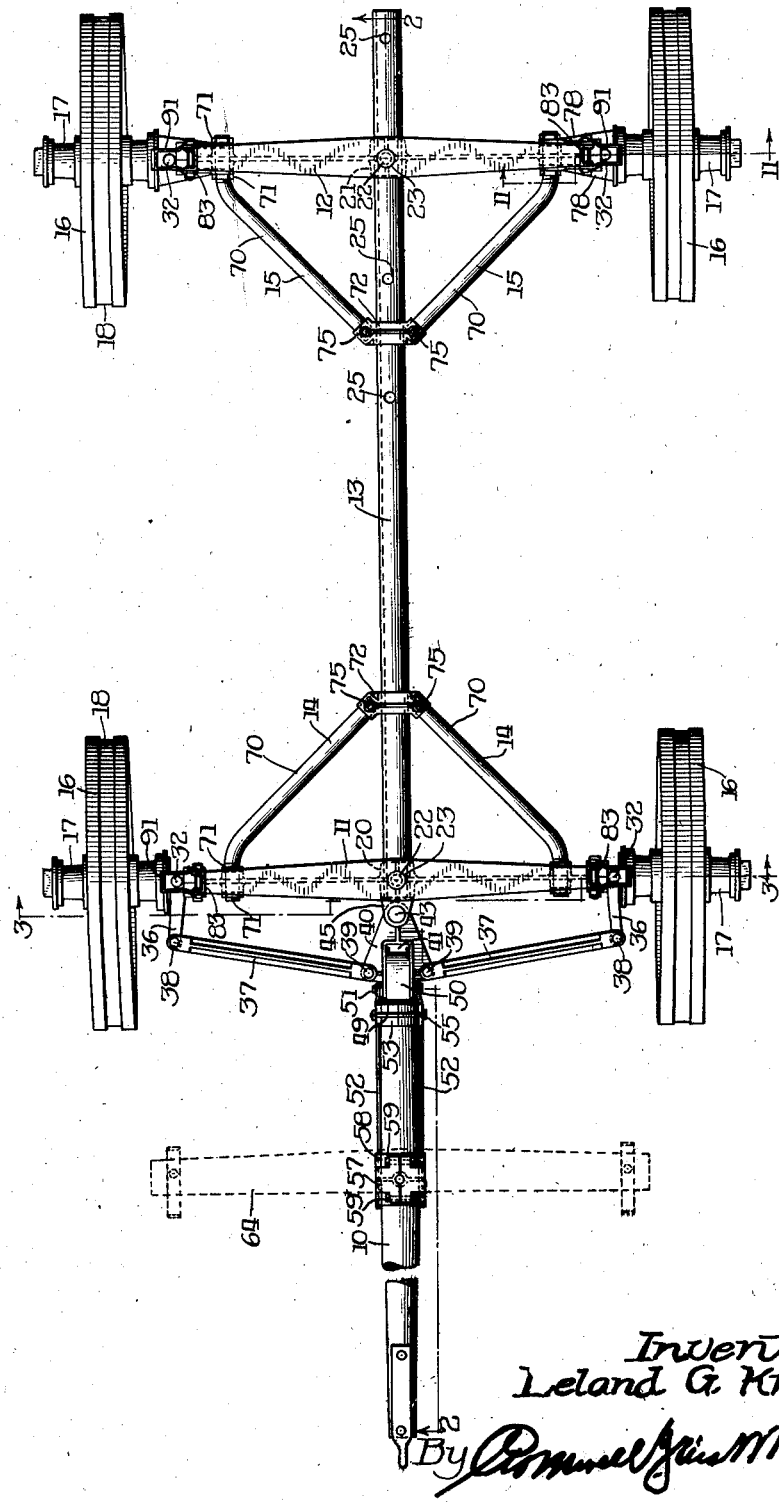
Fig. 1 is a top plan view of a farm truck constructed in accordance with the present invention.

Figs. 6, 7 and 8 are detail cross-sectional views of the tongue structure, as on the lines 6—6, 7—7 and 8—8, respectively, Fig. 4;

Fig. 9 is a similar view on the line 9—9, Fig. 4, through one of the hound couplings;

Fig. 10 is a detail perspective view of one of the hound coupling members;

Fig. 11 is a fragmentary sectional elevation of one end of the rear bolster and the axle-skein carried thereby, as on the line 11—11, Fig. 1;

Fig. 12 is a sectional plan view, taken on the line 12—12, Fig. 11;

Fig. 13 is a detail perspective view of one of the skein connectors for the rear bolster;

Fig. 14 is a cross-sectional view, as on the line 14—14, Fig. 11, illustrating the mounting of the stakes on the bolsters;

Fig. 15 is a sectional plan view, taken on the line 15—15, Fig. 11; and

Fig. 16 is a detail perspective view of one of the stake members.

Referring now in detail to the accompanying drawings, the numeral 10 designates the tongue of the truck; 11 the front bolster; 12 the rear bolster; 13 the reach; 14 the front hounds and 15 the rear hounds. All of these parts are formed of metal.

At the ends of the bolsters 11 and 12 wheels 16 are connected and supported in the manner hereinafter described, each of said wheels including a metallic hub 17, a metallic rim 18 and rod spokes 19 connecting the hub and the rim, the ends of the spokes being upset to fasten the same securely to the hubs and the rims.

Each of the bolsters 11 and 12 is of I-beam construction, the same being provided with centrally-arranged horizontal sleeves 20 and 21, respectively, these sleeves receiving the forward and rear ends of the reach 13. The ends of the latter are held in the sleeves 20 and 21 by coupling pins 22 which pass vertically through the sleeves 20 and 21 and the reach 13, the heads of said coupling pins 22 being received by countersinks 23 formed in the upper faces of the bolsters 11 and 12 so that the heads of the pins 22 lies flush with these faces. The pins 22 are held securely in position by keys 24, such as cotter pins, or their equivalents. To permit adjustment of the rear bolster along the reach 13, and thus either shorten or lengthen the truck, the reach 13 has a series of openings 25 formed therein to receive the coupling pin 22 of the rear bolster, thus permitting the latter to be slid along the reach 13 to the desired point and secured thereat.

The bolsters 11 and 12 are counterparts of each other, which permits interchangeability thereof, and this enables use of the bolsters either at the front or the rear of the truck. Manifestly, a material reduction in the cost of manufacture and assembly of the bolsters thereby is obtained. Each end of the bolsters is so shaped as to provide a vertically disposed recess 26 at the upper and lower ends of which are formed vertically aligned perforated ears 27 and 28. Each recess 26 receives the inner end of an axle-skein 29, which inner end is provided with vertically-aligned perforations 30 and 31 adapted to register with the perforations of the ears 27 and 28. Within the ears 27 and 28, and the openings 30 and 31, is a coupling pin 32 by means of which the axle-skein 29 is held within the recess 26, the coupling pin 32 being fastened to the bolster end by a locking pin 33.

The present truck eliminates the use of the conventional fifth wheel for turning the truck. In lieu thereof the front wheels 16 are mounted so that they may move in unison, this mounting affording turning movement of the truck on a relatively short radius. For accomplishing this a sleeve-like plug 34 is fitted to the inner end of the skein 29 of each of the front wheels. The plug 34 is forced into the inner end of the skein, being held in frictional engagement with a plurality of annular ribs 35 separated by grooves formed at the inner end of the skein, and thereby lightening the construction of the skein by removal of the material in the formation of the grooves. The positioning of the plug 34 is such that its inner end is flush with the inner end of the skein 29, the plug being perforated, as clearly seen in Figs. 3 and 4, and receiving the coupling pin 32. This arrangement holds the plug 34 firmly in the skein, and as the skein likewise is held by the coupling pin 32 there is no relative movement between these parts. Furthermore, the frictional engagement of the plug with the annular ribs 35 is sufficient for holding the plug in contact with these ribs.

Each of the plugs 34 is provided with a forwardly-projecting steering arm 36 on movement of which the skein 29 is swung with respect to the bolster, thus turning the wheel 16 mounted on the skein in either direction according to the movement of the steering arm, and providing for turning the truck. A radius rod 37 has one end pivotally connected to each steering arm 36, as at 38, the other end of the radius rod being pivotally connected, as at 39, to a ribbed swinging tongue-support 40. This support is substantially triangular in plan formation, the same having a centrally-disposed forwardly-directed recess 41 therein for receiving the tongue as hereinafter explained. Each of the pivotal connections 39 is located at one corner of the broadened front end of the support 40. At the rear narrow end of the tongue-support 40, which constitutes the apex of the triangle, is a vertically-disposed sleeve 42 in which is fitted a coupling pin 43 carried by an attaching head 44 provided with upper and lower jaws 45 and 46 between which the rear end of the tongue-support 40 is received. The jaws 45 and 46 are perforated for receiving the pin 43, and through the medium of the latter the tongue-support 40 is capable of lateral swinging in the coupling head 44 in accordance with the movement of the tongue. The rear end of the coupling head 44 is cylindrical in cross section and fits within the forward end of the reach 13, as clearly seen in Figs. 4 and 5. This rear end includes a vertically-disposed sleeve 47 through which passes the coupling pin 22 of the forward bolster 11. This coupling pin, therefore, serves to hold the reach in the sleeve 20 of the forward bolster and also to hold the coupling head 44 within the reach 13.

The tongue 10 is tubular in form, being also of metal, and gradually tapers from its forward to its rear end. Within the rear end of the tongue 10 is fitted a connecting head 48, which is cylindrical in cross-section to fit the cylindrical end of the tongue, said head having a flange 49 which abuts against the extremity of the tongue in order to provide a proper seat for such extremity. The connecting head 48 has an attaching neck 50, the diameter of which is less than the diameter of the head, the neck 50 being substantially square in cross-section, and this attaching neck is fitted in the recess 41 of the tongue-support 40, being pivoted therein by a pin 51. Thus, the connecting head 48 and its neck portion is capable of upward and downward tilting movement in relation to the tongue-support 40.

At opposite sides of the tongue 10 is arranged a pair of draft bars 52. These extend parallel to the tongue 10, the rear ends of the bars 52 being perforated for receiving the pin 51, and through the latter being connected to the tongue support 40. A sectional clamping collar 53 surrounds the rear end of the tongue 10, each section of said collar having parallel guide flanges 54, one of the draft bars 52 being fitted between each pair of said flanges. A fastening bolt 55, or its equivalent, passes through the draft bars 52, the sections of the collar 53, the rear end of the tongue 10, and the connecting head 48, thereby binding these parts together and in rigid relation to each other. The forward end of each draft bar 52 has an outwardly extending draft hook 56. Surrounding the tongue 10, and seated against the draft hooks 56, is a whiffletree support 57 formed of complemental substantially semi-circular members 58, one of which is disposed at each side of the tongue 10 and fastened to the latter by a plurality of securing bolts 59 arranged in pairs above and below the tongue 10, and passing through the upper and lower edges of the members 58. Each of these members 58 has an offset horizontally-disposed guide 60 for the reception of one of the draft bars 52. At the inner side of each of these guides 60 is a series of inwardly-projecting engaging studs 61, said studs fitting in openings 62 formed in the draft bars 52, and thereby serving to anchor the draft bars in engagement with the members of the whiffletree support. The support 57 has a seat 63 at its upper surface, which seat is flat in order properly to support the whiffletree 64 thereon. To secure the whiffletree 64 in position on the support 57 a pivotal pin 65 is employed, the members 58 being formed to provide vertical passages 66 and 67 for receiving the pin 65, the tongue 10 being likewise perforated, as at 68, for the reception of the pin 65. This pin has a wrench head 69, and provides a ready tool for removing the securing nuts of the axle skeins when it is desired to remove the wheels therefrom.

The construction of the whiffletree support and its relation to the draft bars 52, and engagement with the draft hooks 56 thereof, imparts a rigid structure for transmission of part of the strains of the draft imposed on the whiffletree, through the draft bars 52, to the tongue support and the front bolster. At the same time this construction also affords a firm anchorage for the whiffletree on the tongue 10, and prevents displacement of the whiffletree from the tongue. Furthermore, the draft bars 52 reinforce the connection of the tongue 10 with the support 40, so as to supplement connection of the tongue with the support through the connecting head 48.

The hounds 14 and 15 are similar in structure. Each includes a pair of tubular struts 70, each strut being bent to impart thereto the required angle of inclination between the bolsters and the reach, so that the struts of the hounds may lie in the proper divergent relation. One end of each strut 70 is screw-threaded and passes through an opening formed in the web of the bolster with which the strut is associated. Mounted on the threaded ends of the struts are clamping nuts 71, the nuts of each strut being arranged at opposite faces of the bolster and serving to hold the strut firmly attached to the bolster when the nuts 71 are tightened. The other end of each strut is unthreaded, and in order to attach the unthreaded ends of the struts to the reach 13, a hound coupling 72 is employed with each of the hounds. The couplings 72 each comprise a pair of complemental sections, more specifically illustrated in Fig. 10. Each member includes a centrally-disposed dished recess 73 at the opposite sides of which are located divergent sockets 74 into which the unthreaded ends of the struts 70 are fitted. Fastening bolts 75, or their equivalents, pass through the sockets 74 and securely fasten the struts 70 in said sockets. The reach 13 is received by the recesses 73 of the coupling members. Thus it will be seen that the bolsters 11 and 12 are anchored firmly with respect to the reach 13, the latter, however, being free to be adjusted through the bolsters and the hound couplings.

For attaching the rear axle-skeins to the bolster 12 the connector illustrated in Fig. 13 is employed, and by means of this connector each of the skeins is rigidly held on the bolster. The connector includes a sleeve-like plug 76 extending from one end of an attaching head 77 provided with parallel spaced arms 78 having aligned eyes 79 formed therein. The plug 76 frictionally engages the inner end of the axle-skein 29 as described in connection with the skeins of the front wheels. The head 77 is provided with vertically-aligned openings 80, and these openings receive the coupling pin 32 whereby the skein 29 is held to the end of the bolster. The latter fits between the arms 78 so as to be embraced by the arms, and the eyes 79 are fitted to the threaded ends of the hound struts 70, the clamping nuts 71 being employed to fasten the eyes 79 tightly in engagement with opposite sides of the bolster. The construction just described gives firm anchorage of the connectors 77 to the rear bolster, so that the skeins of the rear wheels are tightly held against movement with respect to the bolster.

By reference to Figs. 12 and 13, it will be observed that the head 77 is provided with a V-shaped notch 81 at the end of the space formed between the arms 78, said notch fitting snugly against a correspondingly-shaped wall 82 at the end of the bolster between the perforated ears 27 and 28 thereof. This provides a firm seat for the connector 13 at the end of the bolster.

The stakes of the herein described truck are designated by the numeral 83. Their construction is illustrated in Figs. 14, 15 and 16. Each stake comprises a pair of complemental members 84 having angularly-disposed flanges 85 which rise from a horizontal base 86. An underhanging engaging foot 87 is carried by each of the members 84, the foot 87 being spaced from the base 86 to permit the head flange of the bolster to fit between the base 86 and the engaging hook 87. Each of the depending hooks 87 has an inwardly-extending lug 88 formed thereon, said lug being adapted to engage one or more of a series of notches 89 formed in the edges of the head flange of the bolster. This engagement of the lugs 88 and the notches 89 establishes an interlocked relation between the stakes 83 and the bolsters, and holds the stakes firmly in position on the bolster. To maintain the members of each stake in assembled relation, with the underhanging engaging feet 87 properly positioned with respect to the head flanges of the bolsters, the members of each stake are held together by fastening bolts 90, or their equivalent. These bolts bind the engaging feet upon the bolster, and when the bolts are loosened the stake members may be separated for adjustment in different positions on the bolster to provide for varying widths of wagon bodies that may be used with the truck.

Each of the stakes 83 also is provided with a U-shaped loop 91 which is hingedly connected to the stake, and adapted to receive extension stakes when it is desired to employ the same with the stakes 83.

From the foregoing it is observed that the hereindescribed invention provides a truck the features of which are largely interchangeable, thus reducing the cost of production, and facilitating assembly of the parts in organizing the truck. The bolsters 11 and 12 are of identical construction, and either may be used as the forward or the rear bolster. The front and rear hounds likewise are of identical construction. The struts 70 are interchangeable, and each strut may be used at either the left hand or the right hand side of the reach. The hound couplings are identical in construction. They are interchangeable, and any of the struts 70 may be used with the coupling employed with either the front or the rear hounds. The axle-skeins are interchangeable. Any one of these skeins may be used with any one of the wheels, and each skein may be positioned at either end of either of the bolsters. If used at the front bolster it is but necessary to insert at the inner end of the skein the plug 34 with the steering arm 36. If used at the rear bolster, the plug 76 and the attaching head 77 as embraced in the skein connector illustrated in Fig. 13 would be substituted for the plug 34 with its steering arm 36. The stakes 83 also are identical in construction, and either one of these stakes may be used at any point on either of the bolsters 11 and 12, thereby providing for the interchangeable use of the stakes. Thus, the construction of the truck is reduced to an extremely simplified form, and with such simplification a knock-down arrangement is provided affording ready assembly of the parts, and permitting shipment of the truck in the knock-down condition, with attendant economy in packing and transportation.

The hereindescribed truck also possesses a low center of gravity, due to the formation and arrangement of the bolsters and the wheel mountings connected to the bolsters. This permits easy loading of the truck, the body carried by the bolsters occupying a relatively low position. This low center of gravity likewise frees the truck from liability of upsetting. Notwithstanding the low center of gravity there is also relatively high clearance between the surface of the road and the bottom of the truck, thereby enabling the truck to clear many obstructions frequently met in the hauling of farm trucks over rough country roads and through fields.

I claim:

1. In a truck of the class described, the combination with the front bolster thereof, of steering wheels pivotally connected to the ends of said bolster, a tongue support of substantially triangular formation associated with the bolster and provided with a centrally-disposed forwardly-directed recess in its broad end and a vertically-disposed sleeve in its narrow end, a tongue, a connecting head carried by said tongue and arranged in said recess, means for hingedly connecting said head within said recess of said tongue support, a pair of radius rods extending between said steering wheels and said tongue support, said radius rods being connected to said tongue support at opposite sides of said recess at the broad end of said support, and a coupling pin carried by the bolster and fitted within the vertical sleeve of said tongue support to pivotally connect the tongue support with the bolster.

2. In a truck of the class described, the combination with the front bolster thereof, of steering wheels pivotally connected to the ends of said bolster, a ribbed tongue support of substantially triangular formation associated with the bolster and provided with a centrally-disposed forwardly-directed recess in its broad end and a vertically-disposed sleeve in its narrow end, a tongue, a connecting head carried by said tongue and arranged in said recess, means for hingedly connecting said head within said recess of said tongue support, a pair of radius rods extending between said steering wheels and said tongue support, said radius rods being connected to said tongue support at opposite sides of said recess at the broad end of said support, and a coupling pin carried by the bolster and fitted within the vertical sleeve of said tongue support to pivotally connect the tongue support with the bolster.

3. In a truck of the class described, the combination with the front bolster thereof, of a relatively flat tongue support connected to said bolster and provided with a forwardly-directed recess, a tongue, a connecting head carried by said tongue and fitted in said recess of the tongue support, means for hingedly connecting said head with said tongue support, and a plurality of draft bars arranged at opposite sides of said tongue and connected to the means for hingedly connecting the head with the tongue support.

4. In a truck of the class described, the combination with the front bolster thereof, of a tongue support connected to said bolster and provided with a forwardly-directed recess, a tongue, a connecting head carried by said tongue and fitted in said recess of the tongue support, means for hingedly connecting said head with said tongue support, a plurality of draft bars carried by said tongue and arranged at opposite sides thereof, said draft bars being connected to the means for hingedly connecting the head with the tongue support, and means for clamping said draft bars to the sides of the tongue.

5. In a truck of the class described, the combination with the front bolster thereof, of a tongue support connected to said bolster and provided with a recess, a tongue, a connecting head carried by said tongue and fitted in said recess of the tongue support, means for hingedly connecting said head with said tongue support, a pair of draft bars extending lengthwise of said tongue, one of said draft bars being arranged at each side of the tongue, said draft bars having their rear ends connected to the means for hingedly connecting the head with the tongue support, means surrounding the tongue and embracing the forward ends of the draft bars to hold the latter in engagement with the tongue, and a binding member engaging the tongue and the rear ends of the draft bars.

LELAND G. KNAPP.